United States Patent [19]

Love

[11] Patent Number: 4,904,106
[45] Date of Patent: Feb. 27, 1990

[54] SOCKET BEARING

[75] Inventor: Mickey L. Love, Oklahoma City, Okla.

[73] Assignee: Dana Corporation, Toledo, Ohio

[21] Appl. No.: 371,370

[22] Filed: Jun. 26, 1989

[51] Int. Cl.⁴ .............................................. F16C 11/00
[52] U.S. Cl. ..................................... 403/39; 403/135; 403/140; 384/213
[58] Field of Search ............... 384/291, 292, 206, 213, 384/214; 403/35, 36, 37, 38, 39, 40, 135, 140

[56] References Cited

U.S. PATENT DOCUMENTS

| | | | |
|---|---|---|---|
| 1,377,866 | 5/1921 | White | 384/291 |
| 1,693,748 | 12/1928 | Fiegel et al. | |
| 2,527,787 | 10/1950 | Berger | 403/39 |
| 2,701,151 | 2/1955 | Booth . | |
| 2,733,085 | 1/1956 | Latzen . | |
| 2,809,855 | 10/1957 | Booth . | |
| 2,815,253 | 12/1957 | Spriggs . | |
| 2,823,055 | 2/1958 | Booth . | |
| 2,932,534 | 4/1960 | Williams | 403/140 |
| 2,971,787 | 2/1961 | Lincoln . | |
| 3,041,094 | 6/1962 | Herbenar | 403/133 |
| 3,187,590 | 6/1965 | Duggan . | |
| 3,328,100 | 6/1968 | Spokes et al. . | |
| 3,375,028 | 3/1968 | Patton . | |
| 3,395,951 | 8/1968 | Barr et al. . | |
| 3,647,249 | 3/1972 | Baba et al. . | |
| 3,787,127 | 1/1974 | Cutler | 403/133 |
| 3,849,010 | 11/1974 | Herbenar | 403/138 |
| 3,945,739 | 3/1976 | Abe | 403/138 |
| 4,105,267 | 8/1978 | Mori . | |
| 4,143,983 | 5/1977 | McEowen | 403/39 |
| 4,386,869 | 6/1983 | Smith | 403/39 |
| 4,558,960 | 12/1985 | Lehtinen et al. | 384/292 X |
| 4,712,940 | 12/1987 | Wood, Jr. | 403/133 |
| 4,765,757 | 8/1988 | Hartl | 384/213 |

Primary Examiner—Andrew V. Kundrat
Attorney, Agent, or Firm—F. B. McDonald

[57] ABSTRACT

A socket bearing for use in a ball and socket joint includes a plurality of lubrication grooves, some having annular, others having helical, orientations over the interior surface thereof. In a preferred form, the socket is cup-shaped having a spherical interior surface, and includes three parallel radially oriented annular grooves intersected by three longitudinally oriented helical grooves. Each groove defines a radius, and each pair of adjacent grooves defines a land between the grooves. An interface boundary is defined by one side of one groove and the land associated with the side of that particular groove. The interface boundary is radiused, wherein the radius thereof has a value of at least fifty percent of that of the radius of the groove.

10 Claims, 1 Drawing Sheet

U.S. Patent  Feb. 27, 1990  4,904,106
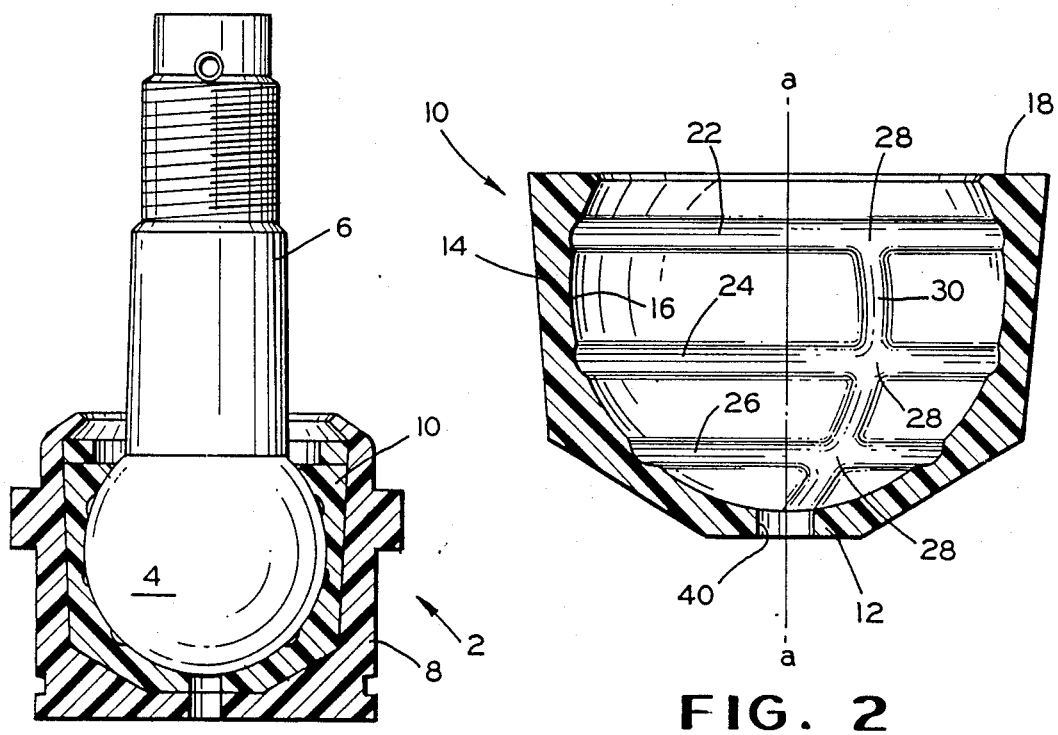
FIG. 1
FIG. 2
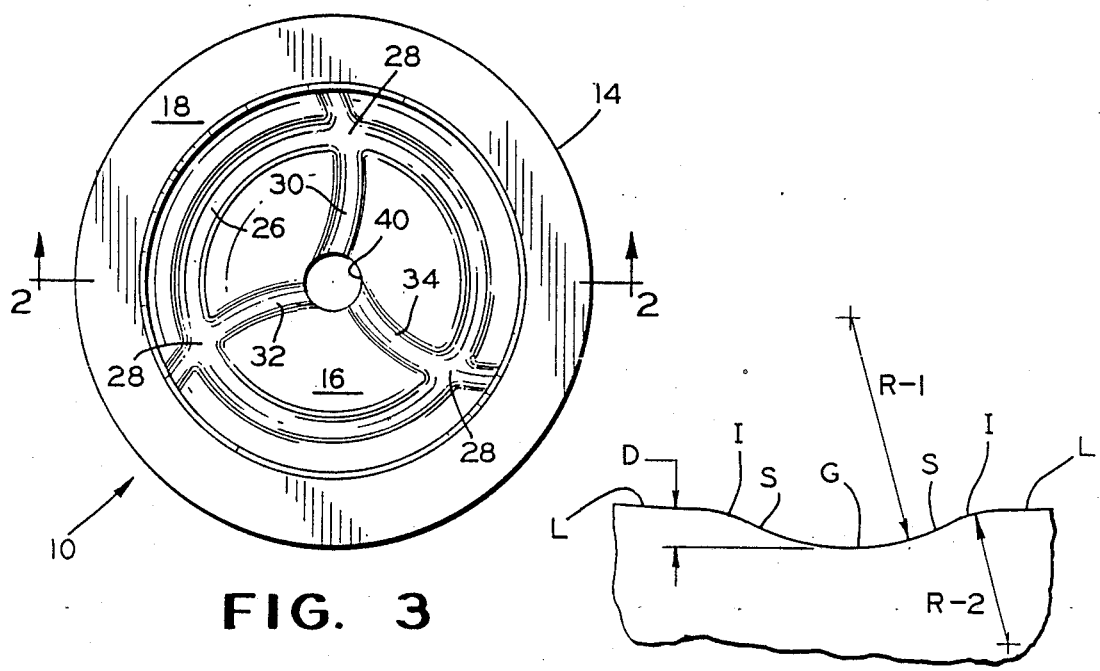
FIG. 3
FIG. 4

SOCKET BEARING

BACKGROUND OF THE INVENTION

This invention relates to ball joints of the type utilized in steering linkages of automotive vehicles. More particularly, this invention relates to the socket bearing portion of ball and socket joints of such linkage systems.

A major problem relating to ball and socket joints is retention of lubrication within the socket-ball interface during the useful life of the joint. Numerous methods have been utilized to obtain satisfactory lubrication of such joints. For example, networks of lubrication grooves, disposed in either the ball or the socket, have been used to distribute lubrication about the ball-socket interface. Such groove designs, however, remain generally deficient, some even permitting lubrication flow out of the interface.

In addition, the need for materials having high lubricity for maximum joint life tends to dictate the use of synthetic nonmetallic bearing materials. The grooves formed in such materials tend to deteriorate under a "cold flow" process wherein the grooves plastically collapse under the bearing loads. This latter problem is perhaps exacerbated by the use of "squared" edges common to typical lubrication grooves. To the extent that sharp edges give rise to higher stresses per given bearing load, squared-edged grooves are inherently weaker. "Abrupt" or sharp edges also tend to scrape lubrication off of the ball rather than to facilitate its transfer onto the ball. This can be a particular problem with a joint which oscillates within a range of only five to eight degrees.

What is needed is a design which would enhance lubrication movement within the ball-socket interface while restricting the loss of lubricant from the interface during the useful life of the joint. In addition, a lubrication groove design is needed which is stronger under the bearing loads imposed upon todays joints. Finally, a design is also needed which would inherently facilitate lubrication transfer from groove to socket-ball contact areas.

SUMMARY OF THE INVENTION

The invention as described and detailed herein incorporates a unique groove network which restricts the loss of lubricant from the ball and socket interface of a steering linkage joint. The socket bearing includes a plurality of intersecting grooves which are radiused at their interfaces with adjacent lands to provide improved transfer of lubricant upon movement of the ball within the socket bearing. In a preferred form, each groove has a radius, and each land-groove interface has a radius at least half of the groove radius. In the same preferred form, the depth of each groove is no greater than thirty percent of the groove radius. The resultant design enables a much greater useful life of the ball joint system, to the extent that the lubrication has less of a tendency to remain within the groove or to be scraped from the ball by abrupt groove edges. The latter phenomenon gives rise to increased wear, particularly where small movements of the ball within the socket bearing do not promote lubrication transfer over the entire socket-ball interface.

BRIEF DESCRIPTION OF THE DRAWINGS

FIG. 1 is a ball and socket joint which incorporates a socket bearing constructed in accordance with the present invention.

FIG. 2. is a cross-sectional elevation view of a preferred embodiment of the socket bearing of the present invention, as viewed along lines 2—2 of FIG. 3.

FIG. 3 is a top plan view of the same preferred embodiment of the socket bearing of the present invention.

FIG. 4 is a fragmentary cross-sectional view of one representative lubrication groove of the socket bearing, highlighting specific groove detail.

DETAILED DESCRIPTION OF A PREFERRED EMBODIMENT

Referring initially to FIG. 1, a ball and socket joint 2 incorporates a metallic ball 4 and a metallic stud shaft 6 integral with the ball. A socket housing 8 supports a preferred embodiment of a socket bearing 10 adapted to accommodate the ball 4 under conditions of limited movement of the ball within the socket bearing.

Referring to FIG. 2, the socket bearing 10 is cup-shaped, and includes a base 12 which extends radially about a longitudinal axis "a—a". An annular sidewall 14 is integral to the base, and forms the substantial body structure of the socket bearing 10.

Referring now also to FIG. 3, the bearing 10 incorporates a spherical interior surface 16 which terminates at an annular top or rim 18 of the sidewall portion 14. Distributed over the interior surface 16 of the bearing 10 are a plurality of lubrication grooves symmetrically oriented about the axis "a—a" of the bearing 10. In the preferred embodiment, there are two sets of grooves; one set comprised of three parallel radially oriented annular grooves 22, 24, 26, adjacent pairs of grooves 22, 24 and 24, 26 being equidistantly spaced along the interior surface 16. The second set of grooves 30, 32, and 34, also symmetrically oriented about the longitudinal axis "a—a", are helical and originate at an aperture 40 through radial base 12 of the socket bearing 10. The aperture 12 may be coupled to a Zerk fitting (not shown) to provide for in-service lubrication of the joint 2. The radial and helical grooves are oriented in such a manner that they intersect with each other at various points 28 to form a continuous intercommunicating lubrication network. However, it will be noted that the helical grooves 30, 32, and 34 all terminate at the top annular groove 22 (See FIG. 2, showing helical groove 30). Thus, the design of the lubrication network operates to restrict loss of lubricant from the socket 10.

Referring now to FIG. 4, specific attributes of the grooves are shown via reference to a representative cross-section of any one of the six grooves. As will be noted, the representative groove "G", and hence each of the six grooves, has a depth "D" as shown, and each groove has a cross-section shaped as an arc having a radius "R-1". The areas between grooves are called lands "L"; there are two lands "L" associated with each groove "G". Each groove defines a pair of opposed sidewalls "S", wherein an interface boundary "I" is established by the intersection of a sidewall "S" and a respective land "L". The interface boundary "I" is radiused as shown, having a radius "R-2" which in a preferred embodiment is two-thirds "R-1". The radius "R-2" is at least half the groove radius "R-1". In the same preferred form, the groove depth "D" is exactly one-ninth the groove radius R-1.

Also in the same preferred form, the depth "D" of the groove "G" is no greater than the thirty percent of the groove radius "R-1" A preferred material for fabrication of the bearing cup 10 is a synthetic, non-metallic material, such as a polyethylene. The material should be one having a high lubricity, yet durable against wear under conditions of constant compression loading.

Although only one preferred embodiment has been detailed herein, the following claims envision numerous additional embodiments which will fall within their scope.

What is claimed is:

1. In a ball and socket joint, a socket bearing adapted for accommodating a ball, said bearing having an internal bearing surface for engagement with and support of said ball, said internal bearing surface comprising a plurality of lubrication grooves, each groove defining a depth, each adjacent pair of grooves defining a land therebetween, each groove defining a pair of arcuate sidewalls, each sidewall defining an interface boundary with one land; an improvement comprising each of said grooves defining a groove radius, and wherein each sidewall interface boundary defines a boundary radius, said boundary radius being at least fifty percent of said groove radius.

2. The socket bearing of claim 1 wherein said depth of each groove is no greater than thirty percent of said groove radius.

3. The socket bearing of claim 2 wherein said bearing is cup-shaped and has a spherical interior surface for accommodating said ball, wherein said bearing defines a base and an annular housing portion supporting said base, said housing annular portion having a longitudinal axis extending through said bearing, said axis passing through the center of said base, said base extending radially about said axis; wherein a plurality of said grooves have a helical orientation about said longitudinal axis.

4. The socket bearing of claim 3 wherein a plurality of said grooves are annular and have a radial orientation about said longitudinal axis, wherein said annular grooves intersect said helical grooves.

5. The socket bearing of claim 4 wherein said base of said bearing defines an aperture therethrough for admission of a lubrication medium into said interior surface.

6. The socket bearing of claim 5 further comprising an interior surface of a synthetic, non-metallic material.

7. The socket bearing of claim 6 wherein each of said plurality of helically oriented grooves originates at said aperture of said base and terminates at the annular groove positioned farthest from said aperture.

8. The socket bearing of claim 7 wherein said plurality of said annular grooves are equidistantly spaced from one another along said spherical interior surface of said bearing.

9. The socket bearing of claim 8 wherein said interior surface comprises three annular grooves and three helical grooves.

10. The socket bearing of claim 9 wherein each said groove of said bearing comprises a radius exactly fifty percent greater than said radius of said interface boundaries associated with said one groove, and wherein said groove depth is one ninth of said radius of said groove.

* * * * *